METHOD OF AND APPARATUS FOR CYCLIC TRANSMISSION OF DATA

Filed March 20, 1958 2 Sheets-Sheet 1

INVENTOR
Gian Franco Piazza

BY Pierce, Scheffler & Parker
ATTORNEYS

METHOD OF AND APPARATUS FOR CYCLIC TRANSMISSION OF DATA

Filed March 20, 1958 2 Sheets-Sheet 2

INVENTOR

Gian Franco Piazza

BY Pierce, Scheffler & Parker

ATTORNEYS 2,967,234

METHOD OF AND APPARATUS FOR CYCLIC TRANSMISSION OF DATA

Gian Franco Piazza, Wettingen, Switzerland, assignor to Aktiengesellschaft Brown, Boveri & Cie, Baden, Switzerland, a company of Switzerland Filed Mar. 20, 1958, Ser. No. 722,781

Claims priority, application Switzerland Mar. 22, 1957

1 Claim. (Cl. 250—6)

A method is known for the transmission of data on the time distribution principle, according to which sound frequency pulses correlated with the data are transmitted. The individual data are characterized by the frequency. The step-up from one datum to the next, taking place in cyclic sequence, occurs on the transmitting and receiving ends stepwise during the intervals provided between the individual pulses. To insure synchronization of the stepping at the transmitting and receiving ends there is inserted into each cycle a pulse whose length is greater than that of the other pulses, which functions as a synchronization signal. This known system has the disadvantage, as experience has shown, that the intervals between the pulses are often filled up by interference noises; this causes the transmitter and receiver to fall out of pace with each other.

The method according to the present invention is free from this disadvantage. Moreover, it enables an increased speed of transmission compared with the known method at given band width of the transmission channel. Thus, for example, a device operating by the method according to the invention transmits 38 data in a cycle of a duration of 2.4 seconds, requiring a band with a 400 c.p.s. including safety distances from the neighboring channels. The method, where again, in cyclic sequence, pulses are transmitted whose frequencies are characteristic for the correlated data, is characterized in that the pulses are strung together gaplessly and that to insure synchronization of the stepping process in the transmitter and receiver, the pulse sequence is firstly amplitude modulated and secondly provided with a special group of pulses whose frequencies are constant and characteristic for the group in their sequence.

Figure 1:
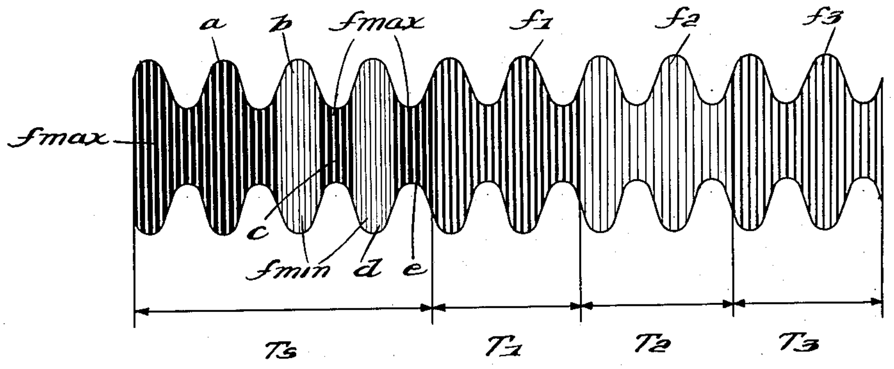
Figure 2A:
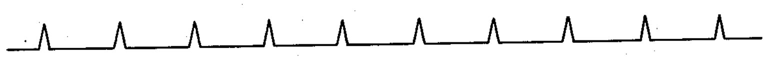
Figure 2B:
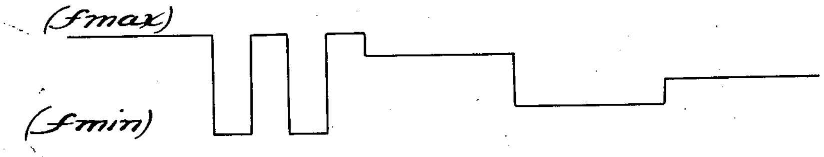
Figure 2C:
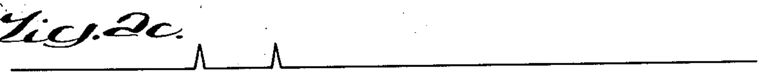
Figure 2D:
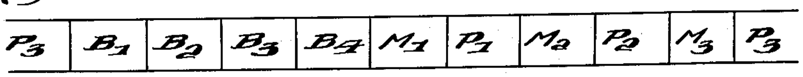
Figure 3:
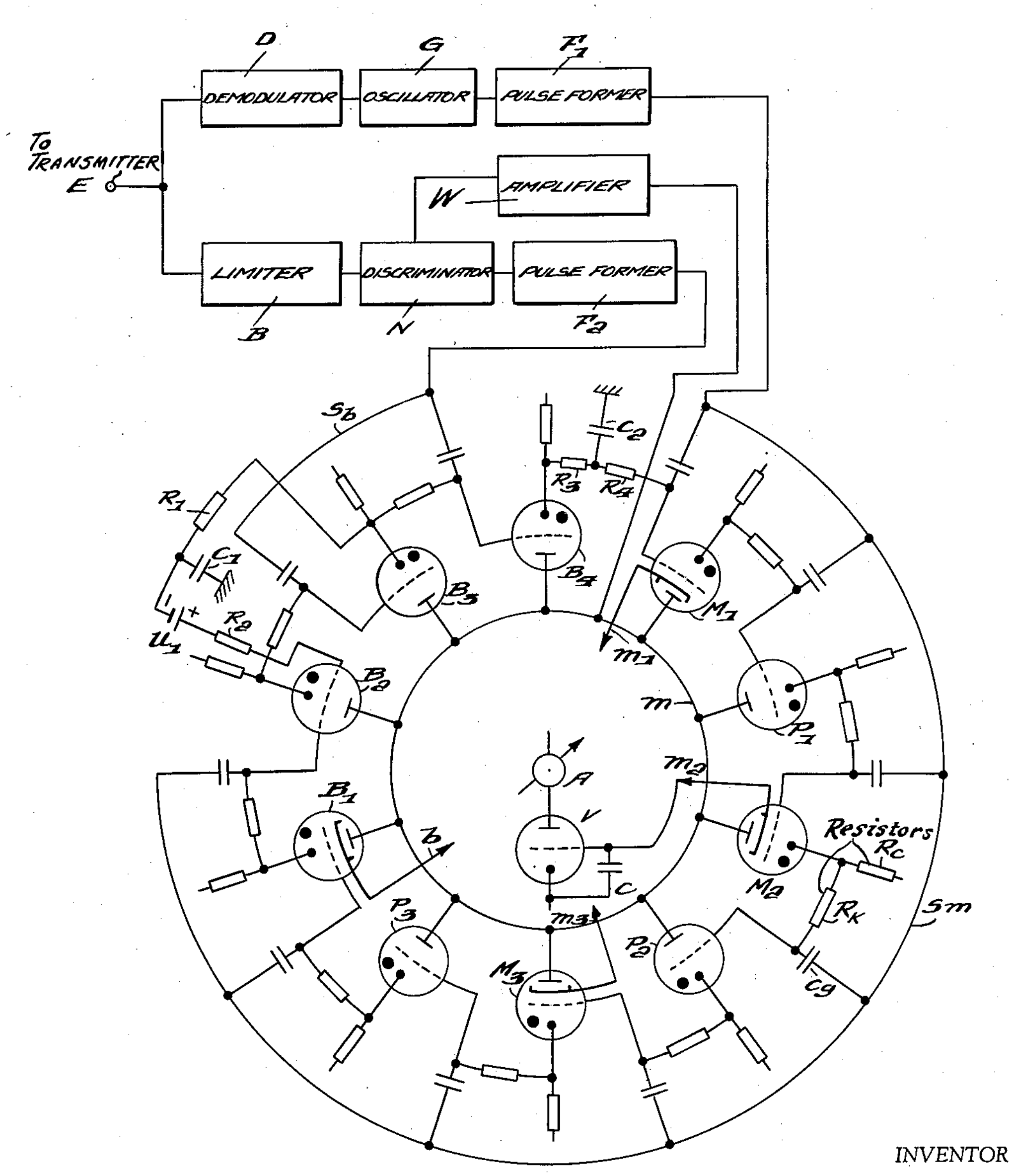

The invention will be illustrated by a typical embodiment to be described in conjunction with the accompanying drawings. In these drawings:

Fig. 1 is a plot of the frequency courses of the various types of pulses transmitted;

Fig. 2*a* is a plot of the pulse instants;

Fig. 2*b* is a plot of the voltage produced by a discriminator element in the receiver of Fig. 3;

Fig. 2*c* is a plot of the pulses produced by a pulse former element in the receiver of Fig. 3;

Fig. 2*d* is a plot indicating the sequence of tube conduction in the receiver of Fig. 3; and Fig. 3 is a circuit diagram of the receiver showing the various control components in block form and the counting ring composed of gaseous discharge tubes arranged for sequential conduction.

Fig. 1 illustrates the method with reference to the pulse sequence transmitted in a cycle, which sequence shows, as an example, besides the special pulse group serving to insure synchronization, only pulses for three data. These latter pulses, *f*1, *f*2 and *f*3, are strung together gaplessly and are transmitted during the times T1, T2, T3 of equal length. They characterize the magnitudes of the correlated data by their frequency; this is indicated in the figure by different hatching of the individual pulses. The special pulse group, which is inserted between the neighboring groups again gaplessly, is transmitted during the time T*s*. In the example shown, it contains five pulses, the lengths of the second to fifth pulses differing from the length T of the pulses transmitting the data; in fact, they are $T/4$. The frequencies of the pulses of the special group are constant from cycle to cycle. In consideration of the properties of the example of a transmission device to be described below, these pulses have frequencies which are equal to the maximum frequency $f_{max}$ or respectively equal to the minimum frequency $f_{min}$ that can occur during the transmission of the data. In the example shown according to Fig. 1, pulses *a*, *c* and *e* of the special group exhibit the frequency $f_{max}$, pulses *b* and *d* exhibit the frequency $f_{min}$.

According to the invention, the entire pulse sequence is further amplitude modulated; in the example shown, the degree of modulation is about 35%, and the period of the sinusoidal modulation signal is half the length T of the pulse transmitting a datum. In the device, which operates at the speed of transmission stated above, this length is for example 60 milliseconds, and therefore the frequency of the modulation signal 33⅓ c.p.s.

The transmission device operating according to the method stated is characterized by an oscillator in the receiver, which oscillator is synchronized by the modulation signal and whose output voltage controls the stepping process, as well as by means in the receiver which upon occurrence of the special group produce a signal, which serves to control the synchronization and, if necessary, to restore it.

Fig. 3 shows, as an example, the circuit diagram of such a receiver. Only the parts important for the comprehension of the invention are represented.

The signal supplied to the input terminal E, whose construction is shown in Fig. 1, reaches simultaneously two different parts of the receiver. In the first part (D, G, $F_1$) there occurs the evaluation of the amplitude modulation; in the second part (B, N, $F_2$), the evaluation of the information impressed on the individual pulses by their different frequencies. The signals occurring at some important points of the receiver are represented in the various lines of Fig. 2, whose time scales are chosen the same as those of Fig. 1 thereabove.

The first part of the receiver contains in the first place the demodulator D, which recovers the modulation signal. The latter is, according to the above stated numerical example, a sinusoidal vibration of the frequency 33⅓ c.p.s Then follows the oscillator G, which is synchronized by the modulation signal. Its output signal is transformed by the pulse former $F_1$ into a sequence of periodically occurring pulses following each other, always with reference to the above stated numerical examples, with the frequency 33⅓ c.p.s. (Fig. 2*a*). These pulses reach the line $S_m$ and serve for the step-by-step shifting of the counting ring consisting of the gaseous discharge tubes M1, P1, M2, P2, etc.

The construction and operation of such counting rings are well known in themselves. It will therefore suffice here to state that in a counting ring, one tube always conducts and that by a control pulse supplied to all tubes jointly the next tube is ignited and, at the same time, the tube until then conducting is extinguished. For example, if at a given moment tube M2 is conducting, its anode current produces at the cathode resistance R*c* a voltage drop which gives the cathode and the control electrode of the next tube (P2) connected with it through the resistance R*k* a positive bias. The stepping pulse jointly supplied to the control electrodes of the tubes through the condensers $C_g$ is so dimensioned in its amplitude that it ignites only that tube whose control electrode was already positively biased, that is, in the present case, tube P2.

It is evident from Fig. 3 that the stepping pulse obtained from the modulation signal can step up the counting ring only from position M1 to position B2, because the control electrodes of two further tubes of the counting ring (B3 and B4) are not connected to line $S_m$ and are therefore not reached by the pulses according to Fig. 2*a*. Instead, these two tubes are ignited successively by a signal which occurs in line $S_b$ and which is produced upon appearance of the special group. As soon as tube B4 is then ignited, the next pulses occurring on line $S_m$ again cause the stepping up of the counting ring from M1 to B2. In this way the synchronization is checked in each cycle. If it is lost for some reason during transmission of the data, it is restored with the next appearance of the special group.

The production of said signal from the special group occurs in the second part of the receiver. This contains in the first place the limiter B, which eliminates the amplitude modulation. Then follows the discriminator N, which produces a D.C. voltage which is correlated with the frequency of the signal applied at E (Fig. 2*b*). From this voltage course the pulse former $F_2$ produces a pulse each time when the D.C. voltage jumps from its minimum value (correlated with $F_{min}$) to its maximum value (correlated with $f_{max}$) (Fig. 2*c*). These pulses form the mentioned signal for the stepping of tubes B3 and B4 of the counting ring.

Fig. 2*d* finally indicates which gas discharge tube is conducting at the particular time.

It is important to realize that a pulse group according to Fig. 2*c*, i.e. with the distance $T/2$, can never occur between the two pulses during the transmission of data pulses, even when the frequencies of neighboring pulses should be extremely different from one another. Jumps from $f_{min}$ to $f_{max}$ cannot follow each other more rapidly than at the distance 2T. It is thus possible to provide a simple safety device which prevents tubes B3 and B4 from being ignited by two individual pulses occurring at a greater distance instead of by the pulse pair according to Fig. 2*c*. For this purpose, means may be provided which bring it about that tube B3, if it is not extinguished within a certain time (namely $T/2$ plus an adequate safety margin) by ignition of tube B4, again ignites tube B2. Stepping from B2 to M1 can then occur exclusively by a pulse pair according to Fig. 2*c*. Such means are indicated in Fig. 3 by parts R1, R2, C1 and U1. R1 and C1 constitute a lag or delay member, whose time constant is to be proportioned according to the rule just stated. U1 is an auxiliary voltage source; R2 leads to a second ignition electrode of tube B2. These means bring it about that when tube B3 is ignited, there occurs at the control electrode of tube B2 an increasing positive voltage, so that after a certain time has passed since ignition of tube B3, tube B2 is re-ignited.

The use of the indicated simple means is, incidentally, of great economic advantage in certain cases. With it, in fact, the receiver of a transmission device need not at first be constructed for the entire number of data that can be transmitted by the transmitter; such a construction can be made later if required. Accordingly, it makes it possible also to connect to a transmitter which transmits a certain number of data, one or more receivers which indicate only some of these data which happen to be of interest for the particular place of observation. In such cases it suffices to equip the counting ring with the tubes B1 to B4 and to provide for each datum to be received a tube pair M1P1, M2P2, etc. After transmission of all data of interest, tube B2 remains conducting, even when the transmitter transmits additional data pulses. Not until the pulse pair according to Fig. 2*c* appears is the counting ring set in motion again. Now it will occur from time to time, however, that during the waiting state of B2, one of these additional data pulses exhibits the frequency $f_{min}$, and the one immediately following, the frequency $f_{max}$. In this case, of course, a pulse will appear in line S*b* which ignites tube B3. In such a case, the above stated safety device shifts back to B2, so that even a repeated appearance of "wrong" pulses (i.e. pulses not attributable to the special group) on line S*b* does not imperil the synchronization.

Another safety device is constituted by the switch elements R3, R4, and C2 of Fig. 3. They bring it about that the positive bias of the control electrode of tube M1 does not appear immediately upon ignition of tube B4, but with a certain lag of the order $T/4$ caused by the time constant R3C2. The reason for taking such a measure is that the oscillator G can continue to run even when for some reason the signal synchronizing it fails briefly. During such a free running of the oscillator generator, certain phase variations may occur; in particular, the pulse sequence according to Fig. 2*a* may be retarded a little in relation to the pulse pair according to Fig. 2*c*. There is then danger that tube M1 will be ignited by a pulse from the sequence according to Fig. 2*a*, which actually should coincide in time with the second pulse of Fig. 2*c* and thus have no effect, but which for the reason referred to occurs a little late. This danger is now eliminated in that tube M1 can be ignited at the earliest about $T/4$ after ignition of tube B4. In fact, the phase variation to be expected will always be much less than $T/4$.

By some or all of the measures explained it is achieved, to summarize, that one of tubes M1, M2, etc. is always conducting when the middle portion of a data pulse is being transmitted (compare Fig. 2*d* with Fig. 1). The transfers between the individual data pulses, on the other hand, always fall into intervals, during which one of tubes P1, P2, etc. is conducting.

Finally the indication of the data will now be taken up briefly, which can be effected by known means. The task in hand is to indicate by a measuring instrument for each the D.C. values according to Fig. 2*b* correlated with the individual data pulses, the indication to be stored until arrival of the next correlated pulse. In the example according to Fig. 3, the D.C. voltage obtained from the discriminator N is supplied to the anodes of all tubes through line *m* after amplification in the amplifier W. Tubes M1, M2 etc. contain probes, which when the tube is conducting assume in close approximation the potential of their anode. A voltage corresponding to the individual data is thus available at the lines $m_1$, $m_2$ etc.; their further processing is shown at line $m_2$: The voltage at $m_2$ charges the condenser C and influences through tube V the measuring or recording instrument A. The condenser maintains its charge practically unchanged during a cycle, so that the deflection of the measuring instrument is preserved until the next correlated pulse arrives.

In the example of Fig. 3 also tube B1 contains a probe. Therefore, when taking as a basis a pulse sequence according to Fig. 1, there occurs at line *b* a voltage which in a connected measuring circuit would cause permanent full deflection. This voltage can be used for checking or regulating purposes, in particular for the continuous control and possible retuning of the discriminator D.

In conclusion, it will be understood that while a one embodiment of the invention has been illustrated, various minor changes therein may be made without, however, departing from the spirit and scope of the invention as defined in the appended claim.

I claim:

Apparatus for the cyclic transmission of data comprising a transmitter producing a gapless string of amplitude modulated data pulse groups and synchronizing pulse groups interposed between said data pulse groups, said data pulse groups including pulses of variable frequencies corresponding respectively to the different data to be transmitted, and said pulses in said synchronizing groups being of different but constant frequency and of the same period of amplitude modulation as said data pulses; and a receiver connected to said transmitter, said receiver including a counting ring comprising a first group of tube pairs arranged for step-like conduction, there being a tube pair for each pulse in said data pulse group and a second group of another pair of tubes arranged for synchronization of the conduction of the tubes of the first group, a demodulator connected to said transmitter, an oscillator connected to and controlled by the output of said demodulator, a first pulse former connected to said oscillator for converting the oscillator output into a sequence of periodically occurring impulses corresponding to the frequency of modulation of said pulses, means applying the output from said first pulse former to the tube pairs of said first group of tubes in said counting ring for controlling their step-by-step conduction, a limiter connected to said transmitter for eliminating the amplitude modulation of said pulses, a discriminator connected to the output of said limiter for producing a unidirectional voltage which varies with the variation in the respective frequencies of said pulses, a second pulse former connected to the output from said discriminator for producing a pulse each time said unidirectional voltage changes abruptly from one value to another corresponding to the abrupt change in the frequency of the pulses in said synchronizing group, means applying the output from said second pulse former to the tube pair of said second group of tubes in said counting ring for synchronizing the periodic operation of the tubes in said first group, means applying the direct current output from said discriminator to all of the tube pairs of said first group, and pulse data measuring means connected to each of said tube pairs of said first group.

References Cited in the file of this patent

UNITED STATES PATENTS

| | | |
|---|---|---|
| 1,734,038 | Levy | Nov. 5, 1929 |
| 1,761,118 | Goldsmith | June 3, 1930 |
| 2,448,055 | Silver et al. | Aug. 31, 1948 |
| 2,650,264 | Weimer | Aug. 25, 1953 |
| 2,676,245 | Doelz | Apr. 20, 1954 |
| 2,753,448 | Rines | July 3, 1956 |

FOREIGN PATENTS

| | | |
|---|---|---|
| 896,364 | France | Apr. 24, 1944 |